United States Patent [19]
Miller et al.

[11] Patent Number: 5,618,331
[45] Date of Patent: Apr. 8, 1997

[54] VAPOR PHASE FLUIDIZED BED SULFATION OF TITANIFEROUS MATERIALS

[75] Inventors: Jorge Miller; Miguel Kling, both of Bogota, Colombia

[73] Assignee: Kemicraft Overseas Limited, Douglas, Isle of Man

[21] Appl. No.: 566,830

[22] Filed: Dec. 4, 1995

[51] Int. Cl.⁶ .............................. C22B 3/08; C01G 23/047
[52] U.S. Cl. .................................................. 75/743; 423/74
[58] Field of Search ................... 75/435, 743; 423/36, 423/68; 428/74, 82, 610

[56] References Cited

U.S. PATENT DOCUMENTS

| | | | |
|---|---|---|---|
| 2,850,357 | 9/1958 | Myers et al. .............................. | 23/117 |
| 3,091,515 | 5/1963 | Dantro et al. .............................. | 23/202 |
| 4,010,246 | 3/1977 | Steinrotter et al. ....................... | 423/542 |
| 4,288,418 | 9/1981 | Davis et al. ................................ | 423/83 |
| 4,399,118 | 8/1983 | Fennemann ............................... | 423/489 |
| 5,229,087 | 7/1993 | Schultz et al. ............................. | 423/82 |

Primary Examiner—David A. Simmons
Assistant Examiner—J. A. Lorengo
Attorney, Agent, or Firm—Jacobson, Price, Holman & Stern, PLLC

[57] ABSTRACT

An economic, non-polluting vapor-phase system of extracting titanium values from titanium ore or slag comprises solubilizing titanium (in ore or slag) with sulfuric acid to form titanyl sulfate, hydrolyzing the titanyl sulfate to form titanium oxide hydrate, converting the latter to pigment, and recycling sulfuric acid for extracting titanium values from further ore or slag. Methodology and equipment are provided.

22 Claims, 2 Drawing Sheets

VAPOR PHASE FLUIDIZED BED SULFATION OF TITANIFEROUS MATERIALS

FIELD OF THE INVENTION

A process and appropriate apparatus are provided for attacking titanium ore or slag and extracting titanium values therefrom.

SUMMARY OF THE INVENTION

A non-polluting vapor-phase system for processing titanium ore or slag comprises: a) solubilizing titanium values (in the ore or slag) in the form of sulfates, b) hydrolyzing obtained titanium sulfate, c) vaporizing resulting sulfuric acid, and d) recycling the sulfuric acid to treat further titanium ore or slag.

An object of the invention is to provide a non-polluting vapor-phase system (process and apparatus) for extracting titanium values from titanium-containing ore and/or slag.

A further object comprises converting titanium values in titanium-containing ore and/or slag to titanyl sulfate, hydrolyzing the titanyl sulfate to produce titanium oxide hydrate and dilute sulfuric acid, recovering titanium oxide and recycling the dilute sulfuric acid.

Another object is to produce titanium pigment ecomonically from titanium ore or slag.

An advantageous optional aspect of the invention comprises using heat from reaction gases to concentrate dilute sulfuric acid, thus reducing the volume of gases entering the reactor and thus reducing the diameter and cost of the reactor.

DETAILS

Figure 1:
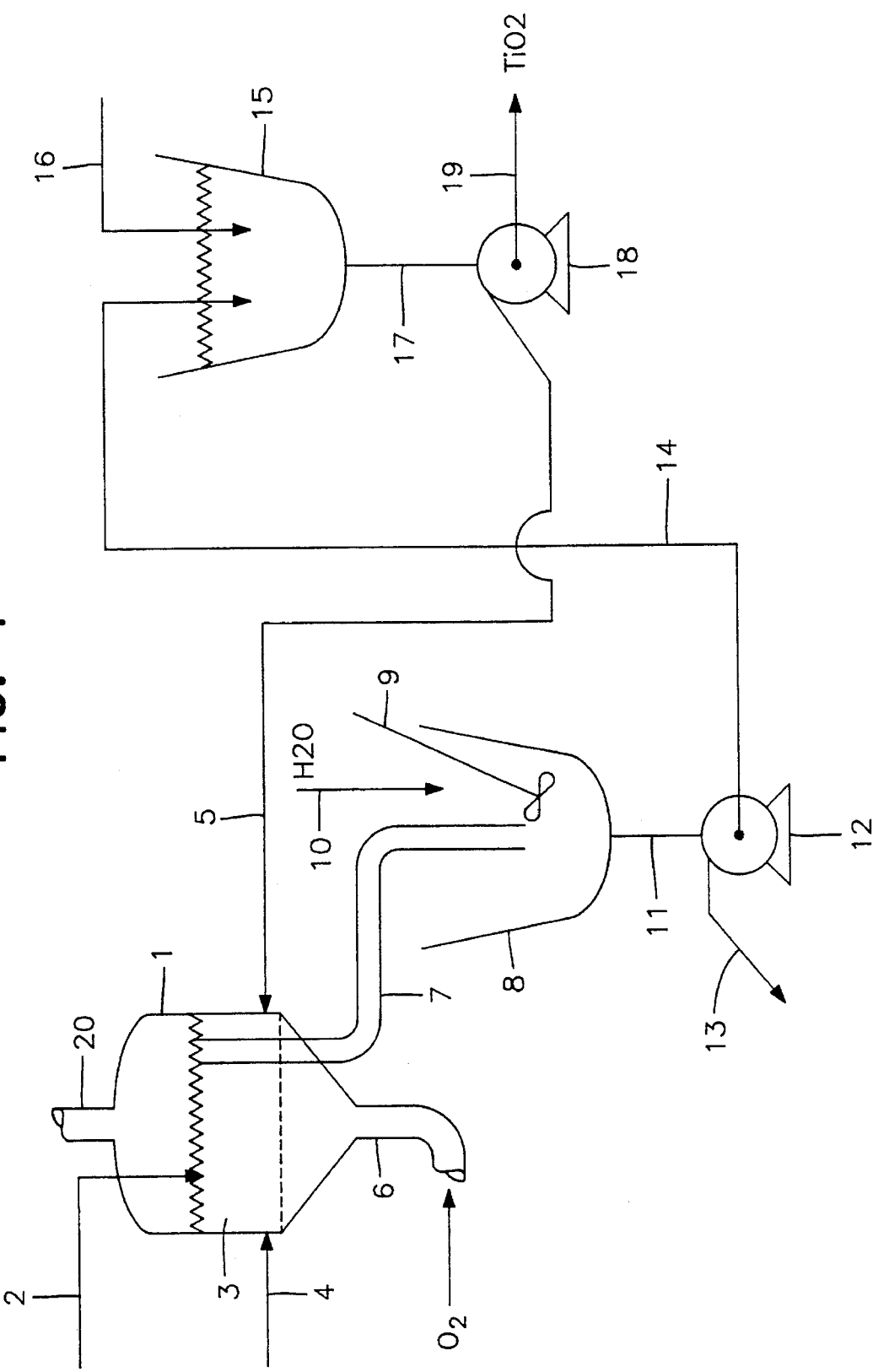
FIG. 1 is a simplified schematic flow diagram of an illustrative system.

FIG. 1 shows reactor 1, into which ground mineral or slag, e.g. pure rutile, is introduced through line 2 and into fluidized bed 3. Heating means for reactor 1 are generally indicated by arrow 4 and are optionally provided by a mantle or structure surrounding at least the lower part or reactor 1, or by any suitable heating means beneath or in fluidized bed 3. When the heating means requires burning fuel, the fuel (for combustion) is introduced, e.g., into reactor 1 through line 4. Dilute sulfuric acid is introduced through line 5; and air or oxygen is introduced through duct 6.

Overflow of the product (containing titanyl sulfate) of the fluidized bed reaction flows through duct 7 to dissolving tank 8, which is fitted with a mixing device 9. Water (for solution) is introduced through line 10. Dissolved titanyl sulfate and undissolved material are transmitted through line 11 to separation means, e.g. filter, 12.

Solids are discharged from the separation means through line 13, and titanyl sulfate solution is conducted through line 14 to hydrolyzing tank 15. The contents of hydrolyzing tank 15 are heated, e.g., by passing steam directly therein through line 16.

Hydrolysis in tank 15 converts the titanyl sulfate solution to a suspension of titanium oxide hydrate in dilute sulfuric acid. The suspension is led through line 17 to separator, e.g. filter, 18, from which dilute sulfuric acid is recycled to fluidized bed reactor 1 through line 5, and titanium oxide hydrate ($TiO_2$) is delivered through line 19. Exhaust gases are conducted out of reactor 1 through pipe 20.

The reactions performed in reactor 1 are:

$$TiO_2 + H_2SO_4 \rightarrow TiOSO_4 + H_2O \quad \text{(I)}$$

$$CH_4 + 2O_2 \rightarrow 2H_2O + \text{HEAT } \Delta \quad \text{(II)}$$

The reaction which takes place in hydrolyzing tank 15 is:

$$TiOSO_4 + nH_2O \rightarrow TiO_2(H_2O) + H_2SO_4 + (n-2)H_2O \quad \text{(III)}$$

By using temperatures above 250° C. in reactor 1, it is possible to process rutile which will not react in the conventional sulfate process with concentrated sulfuric acid.

Figure 2:
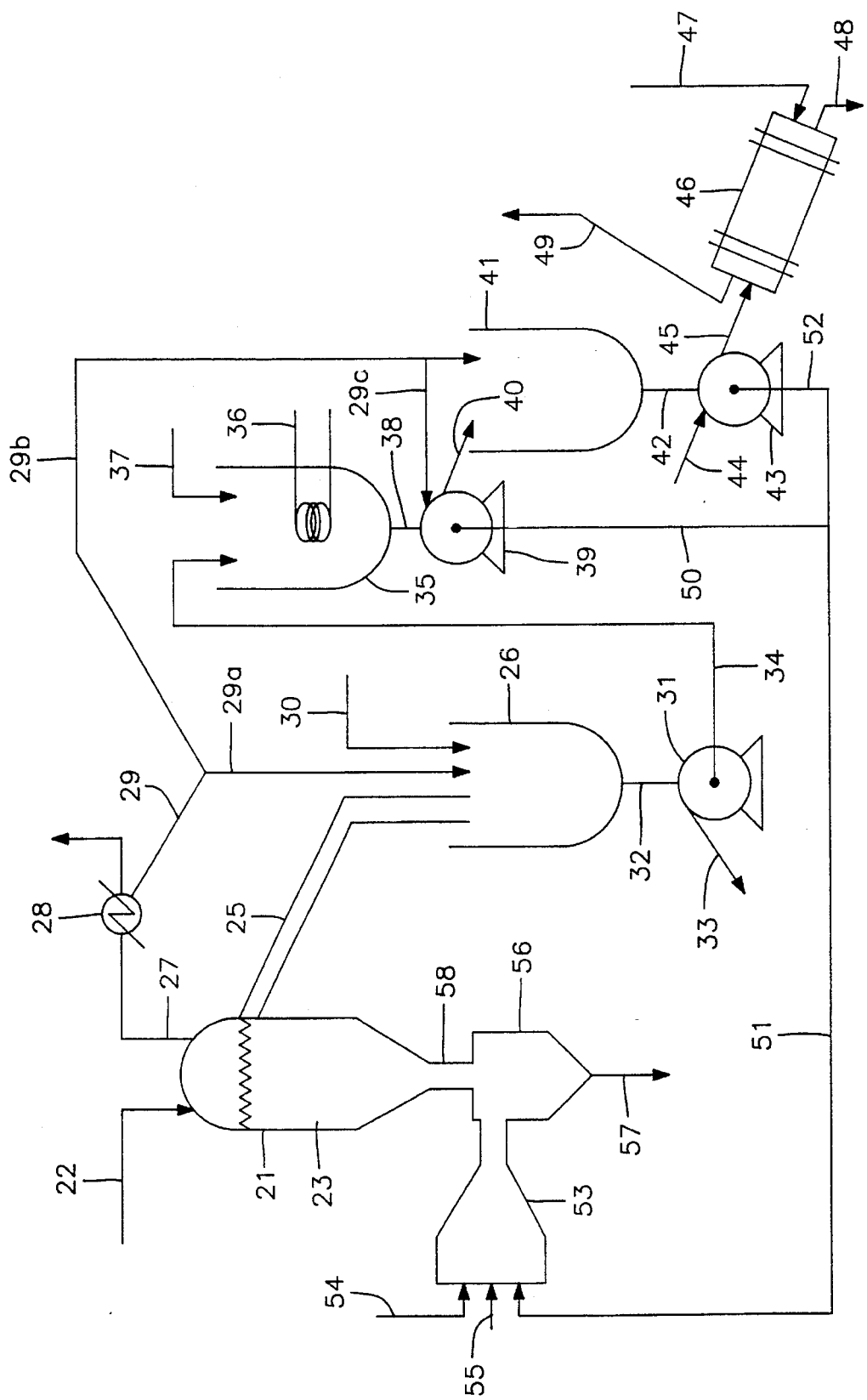
FIG. 2 is a simplified flow diagram of a more complex illustrative system.

FIG. 2 depicts an alternative system wherein impure rutile, titanium slag or ilmenite is readily employed as starting material, and wherein iron or other impurities are present and must be removed.

Ground ore or slag is fed through line 22 into fluidized bed reactor 21, where it meets a current of gases containing water vapor, sulfuric acid vapor, carbon dioxide, excess oxygen and nitrogen (if air is used in flash burner 53 instead of oxygen).

The temperature in fluidized bed 23 is maintained above 480° C. (the decomposition temperature of ferric sulfate), preferably between 550° and 600° C. (at which titanyl sulfate is stable). Reaction products (mainly titanyl sulfate and insoluble ferric oxide) and unreacted material are led through line 25 to dissolving tank 26. Vapor from fluidized bed 23 is conducted through line 27 to condenser 28, from which condensed water is led through line 29, 29a to dissolving tank 26, in which it is combined with reacted material from line 25 and reducing agent (e.g., zinc and iron powder) from line 30.

Titanyl sulfate solution (containing titanous sulfate and insoluble material, such as ferric oxide and silica) is conducted from dissolving tank 26 to separator, e.g. filter, 31 through line 32. Insoluble material is discharged from the separator through line 33.

Liquor containing titanyl sulfate in solution is led through line 34 to hydrolysis tank 35, into which seed is introduced through line 37 to initiate hydrolysis in an established and well-known way (Blomenthal, external, ammonia, etc.)

Once the titanyl sulfate is hydrolyzed by boiling with heating means 36, the resulting suspension of titanium oxide hydrate is conducted through line 38 to separator, e.g. filter, 39, in which the titanium oxide hydrate is separated and washed with water from line 29c. Separated solids, e.g. in the form of filter cake, are transmitted through line 40 to repulping and bleaching tank 41.

Bleaching, a well-known technique, is conventionally conducted, e.g. by adding reducing agent or forming titanous sulfate. Water for repulping is provided through line 29b.

The obtained bleached suspension is conducted through line 42 to separator, e.g. filter, 43, in which it is separated and washed with pure water from line 44. Washed solids, e.g. filter cake, are transmitted through line 45 to calciner 46, in which the titanium oxide hydrate is conventionally transformed into pigment. Fuel for the rotary calciner is introduced (together with air) through line 47. Titanium dioxide pigment is delivered through line 48, and produced gases are exhausted through line 49.

Liquor (containing acid) from separator 39 is conducted through line 50 to line 51. Wash water from separator 43 is similarly conducted through line 52 to line 51. The combined effluent is transmitted through line 51 to flash evaporator furnace 53, where air or oxygen from line 54 and fuel from line 55 are mixed, burned and reacted at a high enough temperature to destroy or insolubilize any sulfates. Temperatures above 600° C. are sufficient for this purpose.

Vapor (containing solids, vaporized water, sulfuric acid, carbon dioxide, etc.) from the flash evaporator furnace is conducted to cyclone 56, in which dust is collected and from which it is thereafter exhausted through line 57. Hot gases from the flash evaporator furnace are delivered to fluidized bed reactor 21 through pipe 58, and provide the required heat for the fluidized bed reaction in reactor 21.

Since the exhaust gases from the fluidized bed reactor are at a sufficiently high temperature, they are optionally used to evaporate part of the water of the sulfuric acid solution efflux from the hydrolysis of titanic sulfate (in hydrolysis tank 35). This is effected, e.g., in a spray drier or evaporator (not shown) placed in line 27.

Pre-evaporation of the sulfuric acid solution results in substantial fuel economy and reduction in diameter of the fluidized bed reactor, which will thus be required to process a lower vapor volume. Similar economies are realized by using oxygen, rather than air, for fuel combustion.

During reaction in the fluidized bed, iron values react first to form ferrous sulfate, which is oxidized to ferric sulfate in the presence of oxygen. It is significant that ferric sulfate decomposes at 480° C., whereas titanyl sulfate is stable at significantly higher temperatures (between 550° and 600° C.). This is an important consideration with regard to insolubilizing iron present in the starting material, particularly ilmenite (which contains about 50 percent FeO). Not only is most of the iron eliminated, but the amount of acid required is reduced. For slags containing only a few percent of iron, the temperature in the flash burner can be maintained high (above 600° C.), and the temperature in the fluidized bed reactor, low (450° C.), making it possible to collect all of the iron values in cyclone 56.

By using a high temperature, any silica gel (which causes most filtration problems) formed in the sulfate process is converted into filterable silica with this system.

Any sulfur dioxide formed during flash evaporation reacts in the fluidized bed to form sulfates.

$$TiO_2 + SO_2 + O_2 \rightarrow TiSO_4 \quad (IV)$$

$$2FeO + 3SO_2 + 2O_2 \rightarrow Fe_2(SO_4)_3 \quad (V)$$

Seeding, hydrolysis and bleaching are well-known and conventional procedures, as are calcining and grinding (specific details of which are not relevant to the subject invention).

FIGS. 1 and 2 exemplify the system with a fluidized bed reactor. This is merely illustrative; alternative types of reactors include a roto-louvre kiln or even a simple rotary kiln. A fluidized bed reactor, particularly one using multiple-bed countercurrent flow, is preferred.

The invention and its advantages will be readily understood from the foregoing description. It is apparent that various changes may be made in the process, in the system and in individual pieces of equipment without departing from the spirit and scope of the invention or sacrificing its material advantages. The process, the system and the equipment hereinbefore described are merely illustrative of preferred embodiments of the invention.

What is claimed is:

1. A non-polluting vapor-phase system for treating titanium-containing material and which comprises:

a) reactor means for reacting titanium values in the titanium-containing material in vapor phase with oxygen and sulfuric acid to produce titanyl sulfate, b) tank means for dissolving the titanyl sulfate in water to obtain an aqueous solution, c) tank means for hydrolyzing the titanyl sulfate in the aqueous solution to produce titanium oxide hydrate and dilute sulfuric acid, and d) means to recycle the dilute sulfuric acid to the reactor means.

2. A system of claim 1 wherein the titanium-containing material is ground mineral or slag, the reactor means comprises means for maintaining its contents at a temperature in excess of 250° C., and the system further comprises:

e) means to separate soluble titanyl sulfate from effluent of tank means (b), and f) means to heat tank means (c).

3. A system of claim 1 wherein the reactor means is fluidized bed reactor means.

4. A system of claim 3 wherein the titanium-containing material is pure rutile.

5. A system of claim 1 wherein the reactor means comprises means for maintaining its contents at a temperature in excess of 480° C. and which further comprises:

g) means to introduce reducing agent into tank means (b), and h) means to seed material contained in tank means (c).

6. A system of claim 5 wherein the titanium-containing material is ground impure rutile, titanium slag or ilmenite, the means for maintaining the contents of the reactor means at a temperature in excess of 480° C. is furnace means for heating the oxygen and sulfuric acid prior to their introduction into the reactor means.

7. A system of claim 6 wherein the reactor means is a fluidized bed reactor means.

8. A system of claim 2 wherein reactor means (a) are means to convert iron impurities in the titanium-containing material to insoluble ferric oxide, and means (e) are means to seperate the insoluble ferric oxide from soluble titanyl sulfate.

9. A non-polluting vapor-phase method for treating titanium-containing material and which comprises the following steps:

a) reacting titanium values in the titanium-containing material in vapor phase with oxygen and sulfuric acid to produce titanyl sulfate, b) dissolving the titanyl sulfate in water to obtain an aqueous solution, c) hydrolyzing the titanyl sulfate in the aqueous solution to produce titanium oxide hydrate and dilute sulfuric acid, and d) recycling the dilute sulfuric acid for further reacting titanium values with oxygen and sulfuric acid to produce titanyl sulfate.

10. A method of claim 9 wherein the titanium-containing material is ground mineral or slag, and step (a) is effected at a temperature in excess of 250° C.

11. A method of claim 10 wherein the titanium-containing material is pure rutile.

12. A method of claim 9 wherein step (c) is effected at an elevated temperature.

13. A method of claim 9 wherein step (a) is effected in a fluidized bed reactor.

14. A method of claim 9 wherein step (a) is effected at a temperature in excess of 480° C.

15. A method of claim 14 which comprises utilizing heat of gaseous effluent from step (a) to concentrate dilute sulfuric acid from step (c) prior to recycling step (d).

16. A method of claim 14 wherein step (a) is effected at a temperature in the range of from about 550° to about 600° C.

17. A method of claim 14 which comprises effecting step (b) in the presence of reducing agent.

18. A method of claim 17 wherein step (c) is effected with seeding.

19. A method of claim 18 wherein the titanium-containing material is ground impure rutile, titanium slag or ilmenite.

20. A method of claim 19 which comprises preheating the oxygen and sulfuric acid for step (a) in a furnace.

21. A method of claim 20 wherein step (a) is effected in a fluidized bed reactor.

22. A method of claim 9 which comprises separating iron impurities in the titanium-containing material from the aqueous solution obtained in step (b) prior to step (c).

* * * * *